United States Patent
Iwasaki et al.

(10) Patent No.: US 7,676,141 B2
(45) Date of Patent: *Mar. 9, 2010

(54) RECORDING APPARATUS AND RECORDING METHOD

(75) Inventors: Shiro Iwasaki, Iizuka (JP); Yoshiho Gotoh, Osaka (JP)

(73) Assignee: Panasonic Corporation, Osaka (JP)

( * ) Notice: Subject to any disclaimer, the term of this patent is extended or adjusted under 35 U.S.C. 154(b) by 1210 days.

This patent is subject to a terminal disclaimer.

(21) Appl. No.: 10/712,372

(22) Filed: Nov. 14, 2003

(65) Prior Publication Data

US 2004/0136694 A1    Jul. 15, 2004

(30) Foreign Application Priority Data

Nov. 15, 2002   (JP)   ............... 2002-331899

(51) Int. Cl.
*H04N 7/00*   (2006.01)
(52) U.S. Cl. ............... 386/100; 386/113; 386/125
(58) Field of Classification Search ........... 386/100, 386/113, 125
See application file for complete search history.

(56) References Cited

U.S. PATENT DOCUMENTS

| | | | |
|---|---|---|---|
| 5,214,781 A | 5/1993 | Miki et al. | |
| 6,813,437 B2 | 11/2004 | Ando et al. | |
| 6,819,865 B2 | 11/2004 | Ando et al. | |
| 6,862,401 B1 * | 3/2005 | Higashida et al. | 386/100 |
| 6,879,773 B2 | 4/2005 | Ando et al. | |
| 7,068,919 B2 | 6/2006 | Ando et al. | |
| 7,076,153 B2 | 7/2006 | Ando et al. | |
| 7,340,153 B2 | 3/2008 | Isobe et al. | |
| 7,346,266 B2 | 3/2008 | Ando et al. | |
| 2001/0009604 A1 | 7/2001 | Ando et al. | |
| 2001/0009605 A1 | 7/2001 | Ando et al. | |
| 2001/0010755 A1 | 8/2001 | Ando et al. | |

(Continued)

FOREIGN PATENT DOCUMENTS

CN    1305187    7/2001

(Continued)

OTHER PUBLICATIONS

Chinese Office Action dated Sep. 21, 2007, issued in Chinese Application No. 200310116160.4 with English translation.

(Continued)

*Primary Examiner*—Marsha D Banks Harold
*Assistant Examiner*—Daniel Tekle
(74) *Attorney, Agent, or Firm*—Wenderoth, Lind & Ponack, L.L.P.

(57) ABSTRACT

An apparatus and method for addressing data losses when power to a digital recorder is unexpectedly interrupted during recording, and a the file management information needed to play back digital content is not completely written to a disc. The recovery process for correcting inconsistencies between the AV data and management information left on the disc is time-consuming. By recording the recovery data used for the data recovery process when power is turned on again, the management information can be recompiled based on the recovery data. Thus, inconsistencies between the AV data and management information can be corrected. Additionally, AV data and recovery data in this case can be written alternately to contiguous areas on the disc.

13 Claims, 4 Drawing Sheets

U.S. PATENT DOCUMENTS

| | | |
|---|---|---|
| 2001/0012443 A1 | 8/2001 | Ando et al. |
| 2002/0018644 A1 | 2/2002 | Isobe et al. |
| 2007/0086749 A1 | 4/2007 | Isobe et al. |
| 2007/0154184 A1* | 7/2007 | Hatanaka et al. ............... 386/98 |
| 2008/0008457 A1 | 1/2008 | Ando et al. |

FOREIGN PATENT DOCUMENTS

| | | |
|---|---|---|
| JP | 2-33621 | 2/1990 |
| JP | 2000-268537 | 9/2000 |
| JP | 2001-126405 | 5/2001 |
| JP | 2001-243707 | 9/2001 |
| JP | 2001266496 | 9/2001 |
| JP | 2002-260368 | 9/2002 |

OTHER PUBLICATIONS

U.S. Patent Office Official Action issued in U.S. Appl. No. 10/712,341, mailed on Jun. 19, 2007.

* cited by examiner

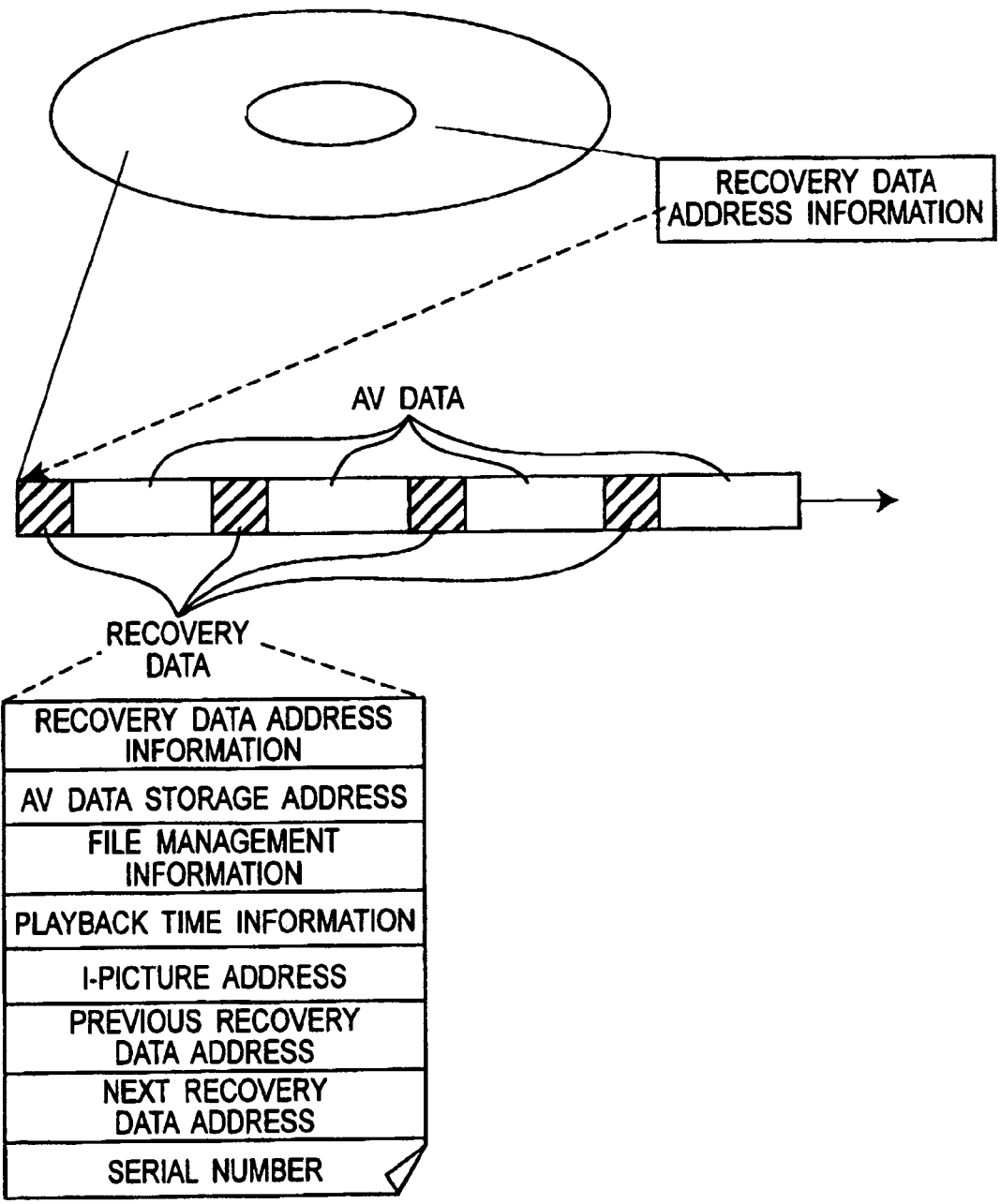

DATA PLACEMENT ON THE RECORDING UNIT

DATA PLACEMENT ON THE RECORDING UNIT

RECORDING APPARATUS AND RECORDING METHOD

BACKGROUND OF THE INVENTION

The present invention relates generally to a digital recording apparatus, and relates more particularly to technology improving the efficiency of a recovery process resolving inconsistencies in AV data and AV data management information left on the disc when the power supply is unexpectedly interrupted.

Digital recorders for recording television programs, movies, and other types of high volume moving picture content to hard disk drive (HDD), Digital Versatile Disc (DVD), and more recently Blu-ray Disc (BD) media are now widely available.

In addition to recording MPEG-encoded AV data, for example, such digital recorders also record management information for the AV data to the digital recording medium. This management information typically includes the title, recording date, aspect ratio, and AV data stream information (data size, time table, frame information) for the AV data content.

One object of conventional digital recorders using optical discs, magneto-optical discs, and other digital media has been to shorten the required processing time when record or power is turned on and off, and when a disc is loaded and ejected (see Japanese Patent Laid-Open Publication (kokai) 2002-260368).

The device taught in Kokai 2002-260368 segments the recording area into multiple zones, and records the management information to an AV management area in either the zone where the magnetic recording head is currently positioned or in an adjacent zone. The address of the area where the management information is recorded is also stored to nonvolatile memory incorporated in the disc cartridge, and when drive power is turned on or a disc is loaded, the disc recorder reads the management information by referencing the address stored to this nonvolatile memory.

This shortens the seek time of the magnetic head when writing the management information, and shortens the processing time required when the power turns on and off and when a disc is loaded and ejected.

The object of this related art is thus to shorten the magnetic head seek time when reading and writing management information when the power turns on or off and when a disc is loaded or ejected, and the management information is written to the digital recording medium only when drive power is intentionally turned off or the disc is ejected.

If the power supply is interrupted during recording due to a power failure or the power cord being accidentally unplugged, however, management information for the recorded data is not written to the recording medium. This unrecorded management information is thus lost and cannot be recorded when the power supply is restored. An inconsistency between the management information on the disc and the recorded AV data thus results when the power supply is returned, and a recovery process for rectifying this inconsistency is needed.

Two basic methods are available for correcting inconsistencies between the AV data and management information during the recovery process: interpolating the lost management information according to the AV data left on disc, and deleting the AV data to match the management information left on disc. The former method involves analyzing the AV data and interpolating the management information based on the analysis, and therefore requires analyzing the AV data.

The problem with the latter method is that only the management information written to the recording medium the last time the disc was normally ejected or the power was normally turned off remains on the disc, and all management information relating to the AV data recorded until just before the power supply failed or was interrupted is lost as a result of the sudden power interruption. All AV data for the program or content recorded until just before the power supply was unexpectedly interrupted must therefore be erased.

An object of the present invention is therefore to provide a digital recording apparatus that can efficiently complete a recovery process for fixing inconsistencies between the AV data and management information left on the disc when the power supply is unexpectedly interrupted during recording, such as when a power failure occurs or the power cord is accidentally unplugged.

SUMMARY OF THE INVENTION

A first aspect of the present invention is to record recovery data interleaved with AV data when recording AV data in conjunction with recovery data where the AV data contains at least audio data or video data and the recovery data is used for correcting AV data management information when AV data recording is not completed normally.

Thus comprised, our invention minimizes the drop in the AV data recording rate in the event recovery data is recorded while recording AV data.

The recovery data preferably contains recording address information for the recorded AV data.

This aspect of the invention enables AV data to be recovered.

Further preferably, the recovery data contains file management information for the recorded AV data, thereby enabling recovering AV data.

Yet further preferably, the recovery data contains playback time information for the recorded AV data.

This shortens the time ne ded for the AV data recovery process.

Further preferably, the AV data is MPEG-encoded data, and the recovery data contains a start address for an I-picture in the recorded AV data.

This enables the recovery process to be easily achieved.

Further preferably, the invention stores recovery data address information indicating the address of the recovery data to a predefined location.

This enables the recovery process to be run easily and efficiently.

The recovery data address information preferably contains multiple storage banks.

This enables the recovery process to be run easily even with recording media that can only be recorded a limited number of times.

A further aspect of the invention stores recovery data address information indicating the address of the recovery data to a recovery data file of a predetermined specified name.

This enables the recovery process to be run easily even with recording media that can only be recorded a limited number of times.

Preferably in this case multiple recovery data files are recorded.

This enables the recovery process to be run asily even with recording media that can only be recorded a limited number of times.

Further preferably, the recovery data address information contains a serial number or time information for the recovery data.

This enables the most recent recovery data address information to be easily identified from among multiple recovery data address information entries.

Yet further preferably, there are at least two recovery data entries, and the recovery data is recorded interleaved with the AV data during AV data recording.

Thus comprised, our invention minimizes the drop in the AV data recording rate in the event recovery data is recorded while recording AV data.

Yet further preferably, the segmented AV data contains address information for the previously recorded segmented recovery data.

This enables easier searching for segmented recovery data.

Yet further preferably, the segmented AV data contains difference information from previously recorded recovery data.

Thus comprised, our invention minimizes the drop in the AV data recording rate in the event recovery data is recorded while recording AV data.

Further preferably, the recovery data contains address information for recovery data recorded next.

This simplifies as arching for the next recovery data.

In a further aspect of the invention the recovery data is recorded interleaved with the AV data when recording the AV data, and identification information enabling the recovery data to be distinguished from other data recorded with the recovery data is recorded with the recovery data so that the recovery data can be detected during the data recovery process.

This enables the recovery data to be easily distinguished from the AV data.

In a further aspect of the invention the recovery data is recorded interleaved with the AV data when recording the AV data, and the recovery data is interleaved with AV data units of a specific size so that the recovery data can be easily detected during the data recovery process.

This simplifies searching for recovery data.

Further preferably, the address where the recovery data is stored is recorded in nonvolatile memory.

By thus storing the newest recovery data address in nonvolatile memory every time the recording address of the recovery data is updated while recording AV data and recovery data, the address of the most recent recovery data can be easily acquired during the recovery process.

Yet further preferably, the nonvolatile memory storing the address where the recovery data is recorded is preferably removably disposed.

This enables data to be recovered on a device other than that used to record the AV data, which is particularly useful when the device that recorded the AV data becomes unusable.

BRIEF DESCRIPTION OF THE DRAWINGS

FIG. 2 shows an example of where data is recorded to the recording medium in a preferred embodiment of the invention;

DETAILED DESCRIPTION OF THE PREFERRED EMBODIMENTS

Preferred embodiments of a digital recording apparatus and recording method according to the present invention are described below with reference to the accompanying figures.

Embodiment 1

Figure 1:
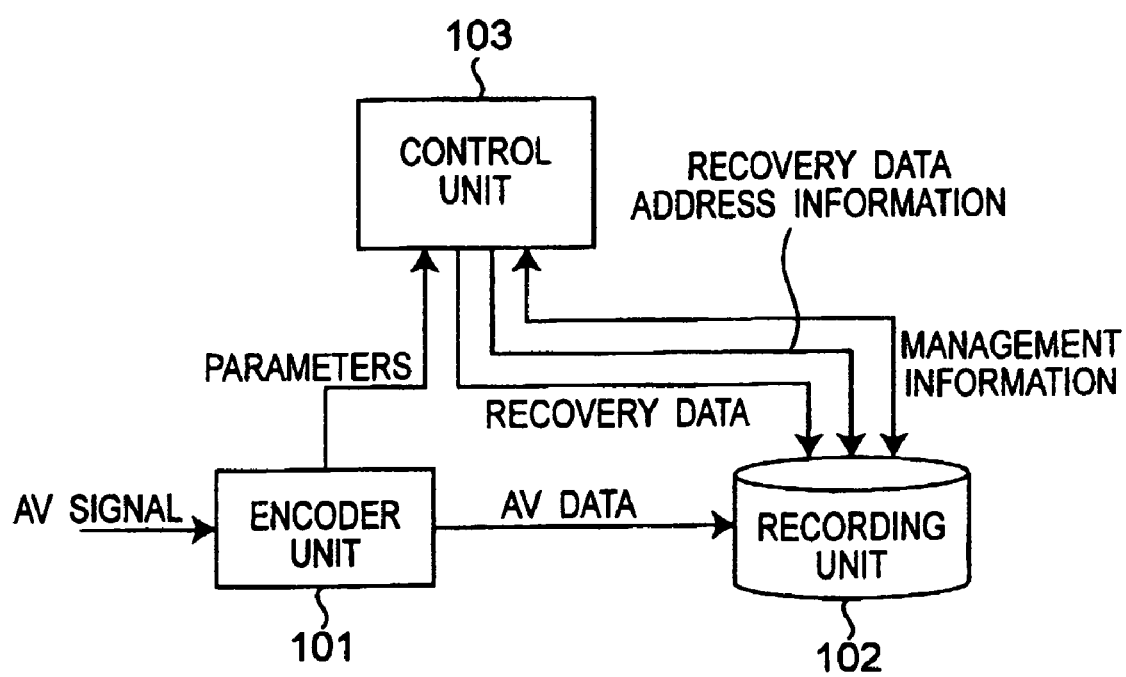
FIG. 1 is a block diagram of a recording apparatus according to a first embodiment of the present invention.

FIG. 1 is a schematic block diagram showing the configuration of a recording apparatus and recording method according to a first embodiment of the invention. The recording apparatus of this first embodiment as show in FIG. 1 has an encoder unit 101, recording unit 102, and control unit 103. The input AV signal includes at least audio data or video data.

The encoder unit 101 compression codes the input AV signal according to the MPEG format, for example, and outputs AV data to the recording unit 102. The encoder unit 101 also outputs AV data encoding parameters, such as the GOP (Group Of Picture) size, I-picture (Intra picture) size, frame number, and audio attributes (monaural, stereo, multilingual), to the control unit 103.

This embodiment is described using an MPEG format for compression coding, but compression coding shall not be limited to MPEG formats and other schemes could be used instead.

The recording unit 102 could be any recording device for recording to such media as HDD, optical discs such as DVD and BD, and magneto-optical discs. The recording unit 102 records and stores AV data input from the encoder unit 101 and management information and recovery data from the control unit 103.

The control unit 103 records AV data management information and recovery data to the recording unit 102. Th management information includes information relating to the AV data based on the parameters received from the encoder unit 101, and information relating to program content. The AV data parameter information includes, for example, the size of the AV data, I-picture size, frame number, and audio attributes, and the content-related information includes the program title, broadcast date and time, broadcast channel, and broadcast genre. The recovery data includes parameters needed to generate the management information. Management information is written to the recording unit 102 when the power is turned off, when the storage medium is ejected, and when recording is completed, for example. Recovery data is written to the recording unit 102 at any desired timing during recording.

FIG. 2 shows how AV data and recovery data recorded by the recording unit 102 are arranged on the recording medium. As shown in FIG. 2 AV data and recovery data are recorded interleaved in a contiguous area of the recording part 102. By thus recording the AV data and recovery data interleaved in AV data recording area 102, the recovery data can be recorded during AV data recording without requiring a head seek operation. The AV data and recovery data can therefore be recorded to the recording area 102 without incurring a drop in the write bitrate due to a seek operation.

FIG. 3 describes the recovery data address information.

Figure 3A:
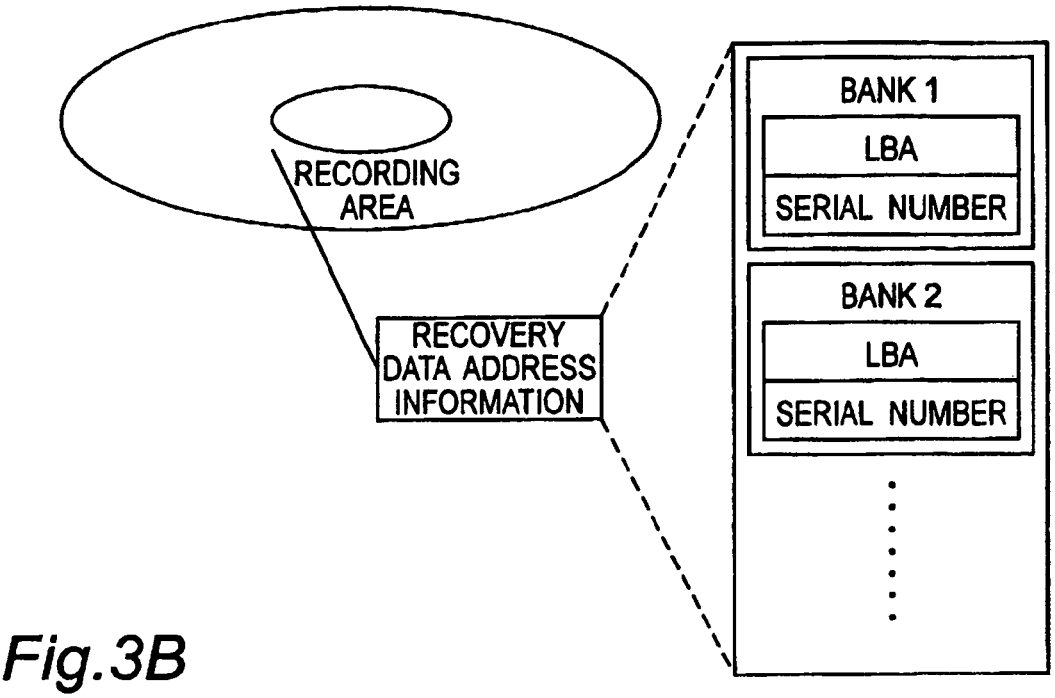
FIG. 3 shows an example of where recovery data is recorded to the recording medium in a preferred embodiment of the invention.

FIG. 3A shows recording the recovery data address information to a specific area in recording area 102. The recovery data address information is a LBA (logical block address) or CHS (cylinder, head, sector) value denoting where the recovery data is located, but could be any information other than the LBA or CHS insofar as it enables uniquely locating the recovery data , The first recovery data address information is recorded in this area before the AV data is recorded. When a recovery process is run after the power supply is returned, the recovery data is read based on this recovery data address information.

If the recovery data address information is thus recorded to multiple banks when using recording media, such as optical discs, that can only be rewritten a limited number of times, the number of times the data area can be rewritten can be effectively increased by thus reducing the number of times the address area is overwritten. Furthermore, by adding a serial number or time information to the recovery data, the most recently written recovery data bank can be easily identified from among multiple banks.

Figure 3B:
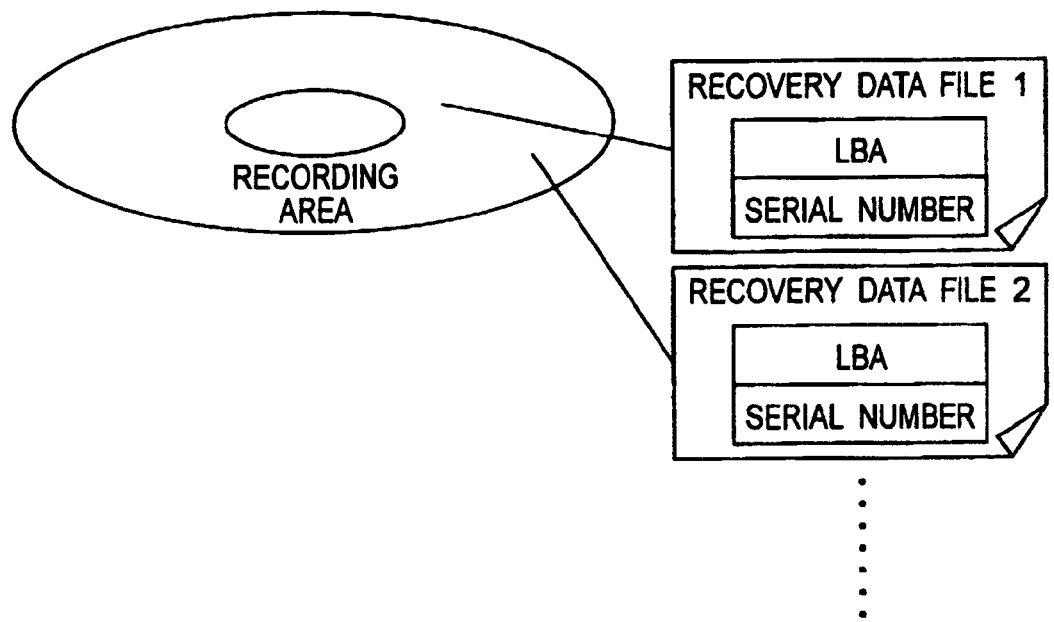

FIG. 3B shows an example in which the recovery data address information is stored to discrete files. In addition to recording the recovery data to a specific predefined area as described above, the recovery data address information can be written to files with specific predetermined names. In this case the address of the first recovery data is written to a file before recording the AV data, this file is then closed, and the recovery data is written to the address just written to the recovery data address file.

If there are multiple files thus storing recovery data, adding a serial number or time information to the file name or the recovery data enables easily identifying the most recent of multiple files.

Furthermore, if identification information is written to the beginning of the recovery data using a bit pattern that does not exist in the AV data, the recovery data can be easily located during the recovery process by searching for this identification information.

If the AV data and recovery data are interleaved at a predetermined fixed interval (e.g., byte count, sector count, or block count), the location of the next recovery data can be determined without using this identification information.

Yet further preferably, the recovery data contains the start address (LBA, CHS, or byte or sector offset value, e.g.) of the next recovery data. This can be achieved by writing AV data of the specified size after writing the recovery data once the size of the next AV data block to be written is determined.

The recovery data further preferably contains the location of the AV data being recorded in recording area 102. This address information is the LBA, CHS, or other sector location value where the AV data is stored. The AV data address information can be r stored in the file system in the recovery process following a power supply interruption by thus including the AV data address information in the recovery data.

Yet further preferably, the recovery data contains file management information for the AV data being recorded. This file management information is preferably information used by the file system when a file is created or updated, and could be, for example, file attributes (inode or dentry information) or bitmap or superblock information. This enables the recovery process to restore the file management information of the file system before the power supply interruption.

Further preferably, the recovery data contains information relating to the AV data playback time. This playback time information manages information such as the GOP size, I-picture size, frame count, audio attributes, or other information relating to the AV data as a time table, and correlates the AV data and playback time for special playback modes such as fast-rewind, fast-forward, and playing frames of a specified time. This playback time information can be reconstructed by analyzing the AV data during the recovery process, but analyzing AV data is time consuming. Recording such playback time information as part of the recovery data therefore makes it possible to get the playback time information during the recovery process without analyzing the AV data, and therefore shortens the time needed for the recovery process.

Further preferably the recovery data contains the start address of an I-picture in the AV data. This I-picture address is not limited to the LBA or CHS value, and can be expressed using an offset value of a specific number of bytes from the beginning of the AV data file or a fixed byte offset of sectors and blocks. I-picture addresses can be reconstructed by analyzing the AV data during the recovery process, but analyzing AV data is time consuming. Recording the I-picture address as part of the recovery data therefore makes it possible to get the I-picture address during the recovery process without analyzing the AV data, and therefore shortens the time needed for the recovery process.

The recovery data can be written to a contiguous recovery data recording area, or segmented to multiple recovery data recording areas. One method of segmenting the recovery data among multiple areas is to simply divide the recovery data into multiple substantially equal parts for recording. A second method is to write only the content of the recovery data that was updated since the last time the recovery data was written. Both cases, however, reduce the amount of recovery data that must be written at one time. If the recovery data is thus recorded in segments, the recovery process can be simplified by also recording a serial number or identifier describing the relationship between the recovery data segments so that the segments can be easily reassembled.

The encoder unit 101 in this embodiment of the invention compresses the input AV signal. If a compressed AV signal such as from a digital broadcast satellite is recorded, however, the encoder unit 101 can simply extract the encoding parameters from the input AV signal and does not need to re-encode the AV signal. The full benefit of the present invention as described above is also achieved in this case.

Second Embodiment

Figure 4:
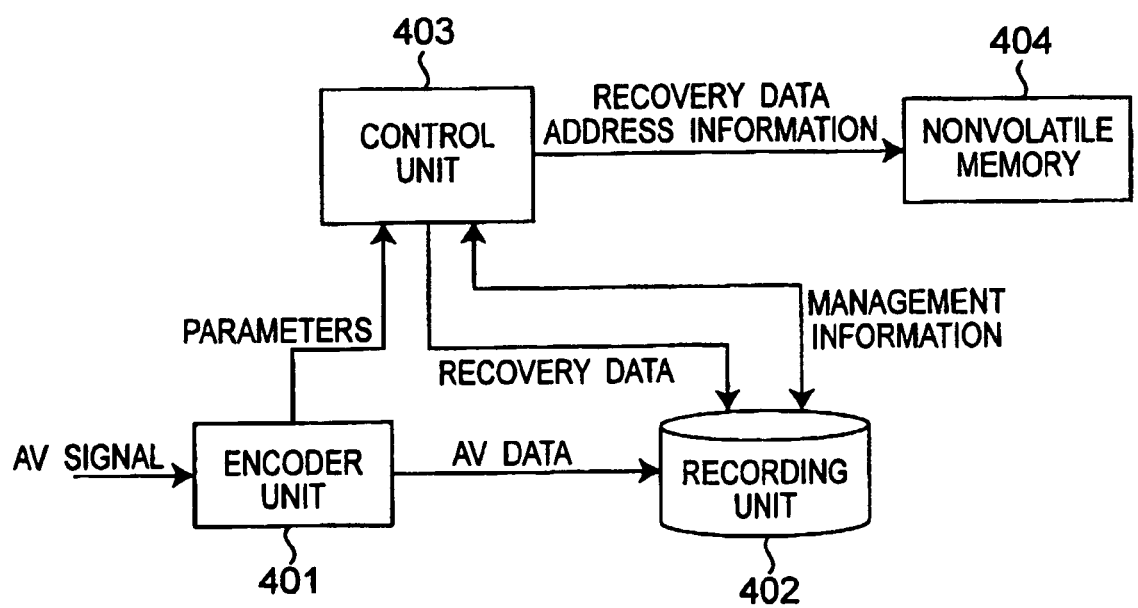
FIG. 4 is a block diagram of a recording apparatus according to a second embodiment of the present invention.

A second embodiment of the invention is described next with reference to FIG. 4 showing an exemplary recording apparatus and recording method of the invention. As shown in FIG. 4 this recording apparatus has an encoder unit 401, recording unit 402, a control unit 403, and a recording medium such as nonvolatile memory 404. The input AV signal includes at least audio data or video data.

The encoder unit 401, recording unit 402, and control unit 403 are same as the corresponding components of the first embodiment described above. The recording apparatus of this second embodiment differs from the first embodiment in having nonvolatile memory 404.

The nonvolatile memory 404 stores the recovery data address information shown in FIG. 3. The recovery data address information shown in FIG. 3A and FIG. 3B are the same in this embodiment as in the first embodiment. The same benefit described in the first embodiment can be achieved whether the recovery data address information is recorded to the recording medium or to nonvolatile memory 404.

If the recovery data address information is recorded to nonvolatile memory 404 instead of recording area 402, a head seek operation is not needed each time the recovery data is updated when recording AV data even if the recovery data address information in nonvolatile memory 404 is rewritten to the updated recovery data address. Searching for recovery data during the recovery process is therefore faster than in the first embodiment without lowering the AV data write bitrate.

Furthermore, if nonvolatile memory 404 can be removed from the main recording apparatus, the recovery process can be run on a separate device with a data recovery function. A portable movie camera may become unusable because the battery runs out during recording or the camera is dropped and damaged, for example. In this case, the recording unit 402 and nonvolatile memory 404 could be removed from the movie camera and installed in another device so that the data in the recording unit 402 and the data in nonvolatile memory 404 can be read and transferred to a device that can recover the recorded content to a playable state.

The content of the recovery data in this case is the same as described in the first embodiment.

The encoder unit 401 in this embodiment of the invention is described as compression encoding the input AV signal. If a compressed AV signal such as from a digital broadcast satellite is recorded, however, the encoder unit 401 can simply extract the encoding parameters from the input AV signal and does not need to re-encode the AV signal. The full benefit of the present invention as described above is also achieved in this case.

The invention as thus described can efficiently run a recovery process for correcting inconsistencies between AV data and recovery data remaining on a disc when an unexpected power supply interruption occurs due to a power failure or the power cord being unplugged while data is being recorded.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A recording apparatus for recording to a recording medium AV data containing at least one of audio data and video data, and recovery data for restoring management information for the AV data when AV data recording did not end normally, recording apparatus, comprising: a first generator operable to generate recovery data for each constant or variable period; a second generator operable to generate AV data; and a recorder operable to interleave the recovery data with the AV data, and to record the interleaved recovery data with the AV data on the recording medium during AV data recording, such that the recovery data and the AV data are recorded in an alternating fashion and in adjacent areas on the recording medium during AV data recording, wherein the recovery data contains, in relation to the AV data, 1) file management information, 2) recording address information, 3) playback time information, and 4) a start address for an I-picture.

2. A recording apparatus as described in claim 1, wherein recovery data address information indicating a location of the recovery data is stored in a predefined area.

3. A recording apparatus as described in claim 2, wherein the recovery data address information comprises multiple banks.

4. A recording apparatus as described in claim 1, wherein recovery data address information indicating an address of the recovery data is stored in a recovery data file of a predetermined name.

5. A recording apparatus as described in claim 4, comprising multiple recovery data files.

6. A recording apparatus as described in claim 2, wherein the recovery data address information includes a serial number or time information.

7. A recording apparatus as described in claim 1, wherein the recovery data is divided into at least two data segments that are recorded interleaved with the AV data when recording the AV data.

8. A recording apparatus as described in claim 7, wherein the segmented recovery data contains a recording address of previously segmented and recorded recovery data.

9. A recording apparatus as described in claim 7, wherein the segmented recovery data contains difference information from previously segmented and recorded recovery data.

10. A recording apparatus as described in claim 1, wherein the recovery data contains address information for next recovery data.

11. A recording apparatus as described in claim 1, wherein identification information for distinguishing the recovery data from other recorded data is recorded with the recovery data.

12. A recording apparatus as described in claim 1, wherein the recovery data is interleaved with AV data of a specific size.

13. A recording method for recording AV data containing at least one of audio data and video data, and recovery data for restoring management information for the AV data when AV data recording did not end normally, comprising recording the recovery data interleaved with the AV data during AV data recording such that the recovery data and the AV data are recorded in an alternating fashion and in adjacent areas on the recording medium during AV data recording.

* * * * *

UNITED STATES PATENT AND TRADEMARK OFFICE
CERTIFICATE OF CORRECTION

| | | |
|---|---|---|
| PATENT NO. | : 7,676,141 B2 | Page 1 of 1 |
| APPLICATION NO. | : 10/712372 | |
| DATED | : March 9, 2010 | |
| INVENTOR(S) | : Shiro Iwasaki et al. | |

It is certified that error appears in the above-identified patent and that said Letters Patent is hereby corrected as shown below:

On the Cover Page

Item (57) Abstract, line 3, "and a the file" should read --and the file--.

Signed and Sealed this

Twenty-seventh Day of July, 2010

David J. Kappos
*Director of the United States Patent and Trademark Office*